July 10, 1962 J. M. COLLINS 3,042,934
COMBINED LITTER EXTENSION PILLOW SUPPORT AND BACK REST
Filed April 5, 1960 3 Sheets-Sheet 1

INVENTOR.
JOSEPH M. COLLINS
BY
ATTORNEYS

July 10, 1962 J. M. COLLINS 3,042,934
COMBINED LITTER EXTENSION PILLOW SUPPORT AND BACK REST
Filed April 5, 1960 3 Sheets-Sheet 2

INVENTOR.
JOSEPH M. COLLINS
BY
ATTORNEYS

July 10, 1962 J. M. COLLINS 3,042,934
COMBINED LITTER EXTENSION PILLOW SUPPORT AND BACK REST
Filed April 5, 1960 3 Sheets-Sheet 3
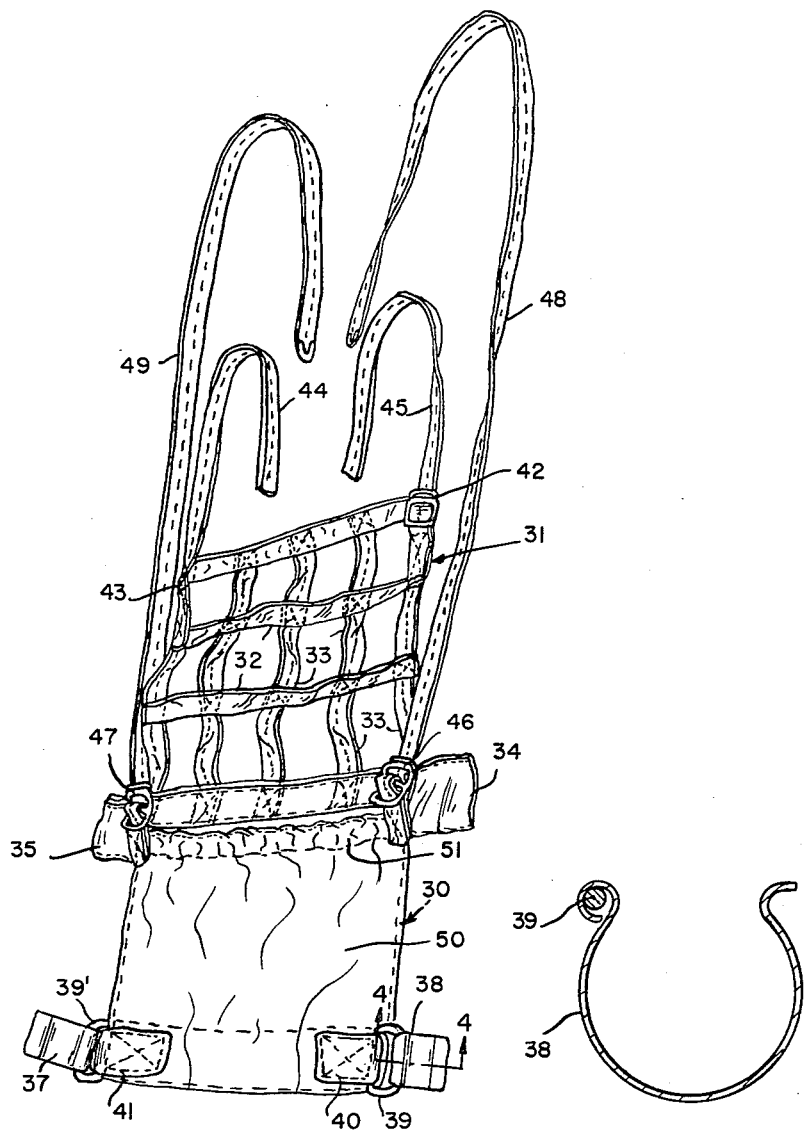
INVENTOR.
JOSEPH M. COLLINS
BY
ATTORNEYS United States Patent Office 3,042,934
Patented July 10, 1962

3,042,934
COMBINED LITTER EXTENSION PILLOW
SUPPORT AND BACK REST
Joseph M. Collins, 110 Poha Lane, Hickam 1,
Honolulu, Hawaii
Filed Apr. 5, 1960, Ser. No. 20,227
3 Claims. (Cl. 5—9)
(Granted under Title 35, U.S. Code (1952), sec. 266)

The invention described herein may be manufactured and used by or for the United States Government for governmental purposes without payment to me of any royalty thereon.

The present invention relates to improvements in litters for the transport of a patient in an aircraft or other vehicle.

It is conventional in aircraft designed for the evacuation of litter patients to provide a framework in the aircraft which includes vertical tubular columns provided with quick release clamping means for receiving the end portions of the litter poles so that the litter when clamped in place forms a bed for the patient. The litter supporting structure and quick release clamping means is conventional and per se forms no part of the present invention.

When litters are mounted in an aircraft in the manner above described to form a bed, there are two deficiencies, namely that the fabric on the litter serving as a bed is sometimes too short for tall patients and there is nothing to serve as a back rest or pillow support, with the result that the pillows often fall to the floor when the aircraft is accelerated during a take-off, and it is difficult to elevate the patient for administration of drugs and for feeding the patient.

In accordance with the present invention these difficulties are obviated by providing a fabric litter extension which can readily be attached to the litter poles when clamped on the vertical supports in the aircraft to form an extension of the body supporting portion of the litter. The litter extension panel is further provided at its outer end with a pair of laterally spaced straps, the terminal ends of which may be adjustably secured to the litter support tubes. An open mesh of fabric tape extending between the above-mentioned straps provides a yieldable pillow support and back rest which is readily adjustable to allow the patient to be raised into a partial sitting position a desired amount and prevents the patient and the pillow from being displaced by acceleration and deceleration forces on the airplane during take-off and landing and greatly aids in giving nursing care where the patient need not be continuously in the prone position. Where it is necessary to elevate a patient to the maximum extent, the litter extension panel may be secured at its lower end to the litter pole terminal portions and the panel and attached mesh may be used in its entirety for a back rest. Additional strap means are provided for securing to the litter support structure to prevent lateral movement of the litter extension and back rest.

For a more complete understanding of the invention, reference should be made to the detailed description hereinafter given, taken in conjunction with the appended drawings in which:

FIG. 3 is a perspective view from below of the embodiment of the invention shown in FIGS. 1 and 2 removed from the litter; and FIG. 4 is a sectional view of a litter pipe engaging C-shaped hook or clamp that is attached to each of the two corners of the fabric panel remote from the mesh panel.

Figure 1:
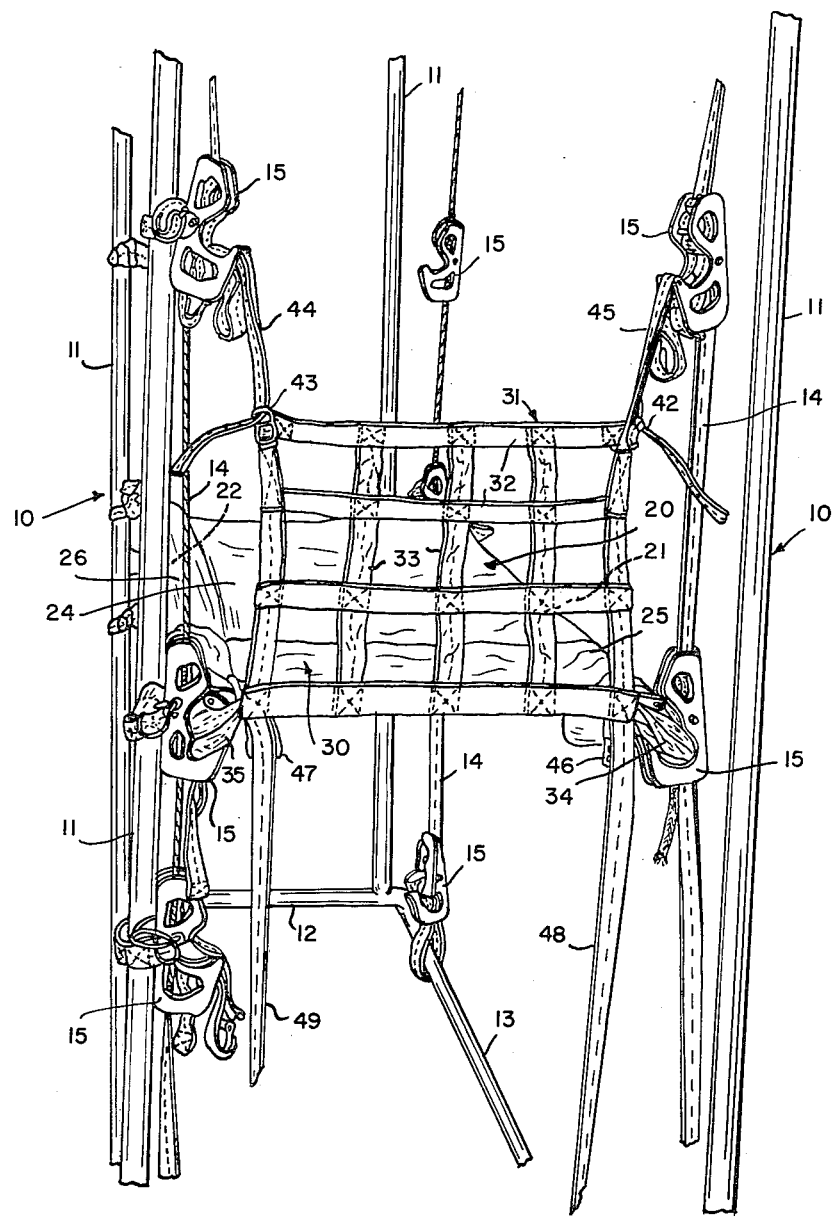
FIG. 1 is a perspective view of a device that embodies the present invention and that comprises a fabric panel that is shown as increasing the length of the body supporting canvas of an aircraft litter and a web or mesh panel disposed about normal to the fabric panel and adjustably attached by straps to the pipes that support the litter in an aircraft.
Figure 2:
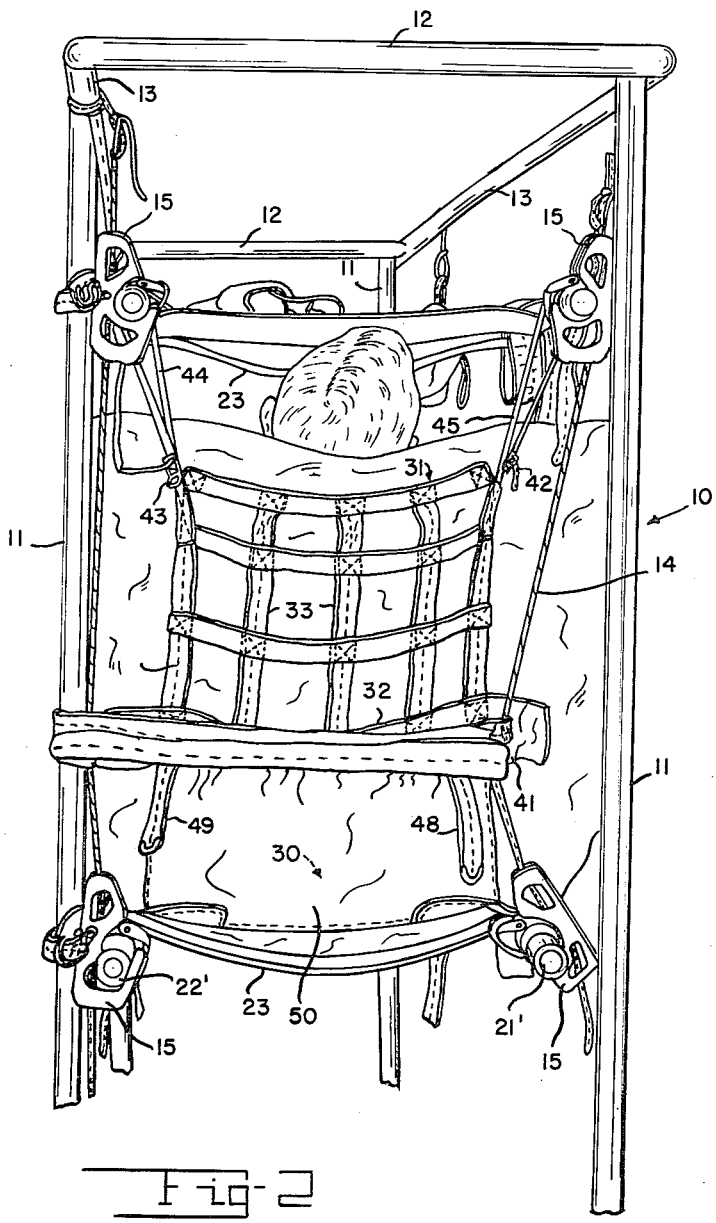
FIG. 2 is an elevational view of the device that is shown in FIG. 1 with both the fabric panel and the mesh panel disposed about normal to the body supporting canvas of the litter, with the device supported by straps for the patient to sit up and eat or read.

In FIGS. 1 and 2 of the drawings, the reference numeral 10 indicates generally a litter supporting frame made of metal pipes and commonly found in aircraft designed for the evacuation of litter patients. The frame 10 includes vertical tubular columns 11, tubular cross-members 12 and longitudinal tubular members 13. Vertical supporting straps 14 are attached to the frame 10 and are supported between upper and lower longitudinal members of the frame. Supporting saddles 15 are adjustably mounted on each of the straps 14 and are adapted to receive and support the handle portions of the poles of the litter in transit that are shown inclosed in sleeves 34 and 35 in FIG. 1 and exposed for use in FIG. 2 as the handles 21' and 22'.

The conventional litters indicated generally at 20 include poles 21 and 22 held in a fixed parallel relationship by means of a rigid cross-member 23 and a corresponding cross-member at the other end of the litter which is not shown. Suspended between the poles 21 and 22 is a sheet of fabric 24 having parallel sleeve portions 25 and 26, at the side edges thereof, slideably receiving the poles 21 and 22. The end portions of said poles extend beyond their corresponding sleeves 25 and 26 to form handle portions 21' and 22' which facilitate handling of the litter, and are held in the supporting saddles 15 when the litter is mounted in the supporting frame.

The attachment constituting the invention here of interest comprises a rectangular shaped fabric panel 30 shown in FIG. 3 of the drawings of the approximate width of a field type litter or stretcher, serving as a litter extension panel that extends the length of the litter a desired amount. A back rest panel taking the form of an open mesh of fabric tape, indicated generally at 31 is attached to one end of the fabric panel 30. The back rest mesh panel 31 shown in FIG. 3 of the drawings comprises a desired plurality of longitudinal or upwardly extending tapes 33 having their lower ends attached to the nearer or upper edge of the fabric panel 30. A desired number of cross or transversely extending tapes 32 are stitched to said longitudinal or upwardly extending tapes to form a webbed back rest panel of approximately the same size as the fabric panel 30. The material used for the fabric panel and the webbing can of canvas, nylon or other flexible, high-strength fabric material.

Fabric sleeves 34 and 35 are stitched to the fabric panel 30 at its corners where the fabric panel joins the back rest mesh panel 31. The sleeves 34 and 35 slide over the lateral pipes of the litter and support the end of the fabric panel 30 at its junction with the mesh panel 31.

The sleeves 34 and 35 may be stitched closed at their ends adjacent to the mesh panel, to provide pockets in which the handle ends of the lateral pipes of the litter are inserted, as shown in FIG. 1 of the drawings. Attached to the sides of the fabric panel adjacent its free end that is remote from the sleeves 34 and 35 are the substantially C-shaped resilient spring clamps 37 and 38. These circular hooks or clamps are attached at one end by links 39 and 39' with webs 40 and 41 that are stitched to the corners of the fabric panel that are remote from the mesh panel 31. The clamps and links are made of high strength, resilient material preferably metal. The clamps are adapted to engage the poles of the litter along its side portions and to removably secure the fabric panel 30 to the litter and to support both lateral corners of the fabric panel on the litter poles 21 and 22.

A pair of buckles 42 and 43 is mounted on the lateral extremities of the unattached end of the webbed portion or mesh panel 31 to releasably secure the ends of the litter extension, web portion supporting straps 44 and 45 mounted on the free end of the webbed portion 31 when the device is mounted in the supporting frame 10 as shown in FIGS. 1 and 2. Mounted on the end of the fabric panel 30 adjacent the end joined to the webbed portion is a pair of buckles 46 and 47 shown in FIG. 3 of the drawings. The pair of buckles 46 and 47 have their middle bars attached by fabric loops to the corners of the fabric panel 30 at its junction with the mesh panel 31. The fabric loops illustratively and in the model are thread attached ends of the pair of supporting straps 48 and 49. The straps 48 and 49, that dangle uselessly in FIG. 1, are lashed around the left hand pipe 11 as shown in FIG. 2, to anchor the litter against lateral motion as the aircraft that carries the injured troops turns, banks, accelerates and decelerates during flight. The webs of the mesh panel 31 that extend toward and are normal to the edge of the fabric panel 30 have their ends stitched to the fabric panel.

A fabric sheet equal in size to the fabric panel 30 is stitched to the underside of the fabric panel along three of its sides to be supported by the panel and to form a pouch 50 that is freely accessible to contain the personal effects of a patient being carried on the litter. An elastic band 51 is stitched along the open side of the pouch to act as a closing means for the pouch.

The back rest mesh panel 31 also serves as a headpiece attachment that can be used in several ways with the litter as shown in the accompanying drawings. FIG. 1 shows the mesh panel 31 normal to the litter body supporting canvas when the straps 44 and 45 are tightened on the upper pair of saddles 15. The lengthening of the straps 44 and 45 lowers the upper edge of the mesh panel 31 such that a pillow on top of the mesh panel is supported thereby and provides a correspondingly longer head supporting surface as an extended pillow supporting headpiece at the end of the litter. The substantially C-shaped spring clamps 37 and 38, each of which engages a ring, are mounted on the poles 21 and 22 of the litter to secure and to support the inner end or the lower edge, as shown in FIG. 3 of the fabric panel 30 across the litter. The sleeves 34 and 35 are fitted over the handle portions 21' and 22' of the poles 21 and 22 to secure and to support the junction of the fabric panel 30 with the mesh panel 31 of the litter extension to the litter.

The webbed or mesh panel 31 of the litter extension is supported in a substantially vertical position by looping the straps 44 and 45 through upper pair of saddles 15 and securing the ends of the straps in the buckles 42 and 43 as shown in FIGS. 1 and 2 of the drawings.

FIG. 2 shows the back rest mesh panel 31 as a pillow and head supporting attachment that is secured to the litter and to the frame 10 in a position to provide a headpiece or a back rest that by the predetermined length of the fabric panel 30 also extends the effective height of the back rest. In this FIG. 2 the litter handles 21 and 21' are below both the fabric panel 30 and the mesh panel 31 with the patient sitting up in bed and resting his back and shoulders against his pillow that in turn is supported by both the fabric panel 30 and the mesh panel 31 that together with their straps and ties comprise the present invention. The substantially C-shaped spring clamps 37 and 38 are attached to the poles 21 and 22 adjacent the end of the litter sheet 24 shown in FIG. 1. In the view shown in FIG. 2, the web panel 31 supporting straps 44 and 45 are strung over the upper pair of saddles 15 and the ends of the straps are secured in the buckles 42 and 43. In this FIG. 2 position, a vertical support is provided by the fabric panel 30 aligned with the mesh panel 31 and backed at their junction with the straps 48 and 49 that dangle inertly in FIG. 1 but in FIG. 2 the straps 48 and 49 are passed around the rope 14 on one side and around at least one of the vertical pipes 11 on the other side to minimize lateral sway of the litter. The device adjusted as shown in FIG. 2 is of a sufficient height to form an effective back rest that is capable of supporting a person in an upright or sitting position. If a head rest of a lesser height is desired, the litter extension panel junction supporting straps 48 and 49 can be strung through the lower pair of litter supporting saddles 15, and the ends of the downwardly extending straps are secured in the buckles 46 and 47. In this position the apparatus provides a vertical support of sufficient height to form an effective pillow support or head rest.

While the form of apparatus herein described constitutes a preferred embodiment of the invention, it is to be understood that the invention is not limited to this precise form of apparatus, and that changes and modifications may be made therein without departing from the scope of the invention which is defined in the appended claims.

What is claimed is:

1. A litter extension pillow support and back rest to be mounted on a carrying handle equipped litter supporting framework provided with litter supporting saddles, the litter extension pillow support and back rest comprising a rectangular fabric first panel of the width of the litter in one dimension and of a length in its other dimension that is to be added to the length of the litter, a rectangular mesh second panel of the width of the litter with one end stitched to one end of the fabric first panel, a pair of litter handle receiving pockets at the two corners of the fabric first panel adjacent its stitched junction with the mesh second panel and disposed laterally thereof to receive the pair of handles at one end of the litter as supports for the end of the fabric first panel at its junction with the mesh second panel, a pair of C-shaped resilient spring clamps secured at the two corners of the fabric first panel that are remote from its junction with the mesh second panel for being releasably hooked over spaced horizontal bars of the litter supporting framework in supporting the end of the fabric first panel that is remote from its junction with the mesh second panel, and a first pair of straps with their buckles attached to the corners of the mesh second panel remote from its junction with the fabric first panel for being attached to the litter supporting framework above the litter extension pillow support and back rest in the support of the litter extension back rest.

2. The litter extension pillow support and back rest defined by the above claim 1 and a second pair of straps with their buckles attached at the lateral ends of the junction between the fabric first panel and the mesh second panel and providing positive support to the junction of the fabric and mesh panels by anchorage with the litter supporting framework.

3. The litter extension pillow support and back rest defined by the above claim 1 and a pouch supported along three of its edges by the peripheral edges of the fabric first panel and disposed beneath the fabric first panel and the pourch having a fourth edge that is unattached to the fabric first panel to provide a pouch mouth portion, and contractile means yieldingly and partially constricting the pouch mouth portion.

(References on following page)

References Cited in the file of this patent

UNITED STATES PATENTS

| | | | |
|---|---|---|---|
| 1,063,423 | Edelin | June 3, | 1913 |
| 1,438,475 | Bisbing | Dec. 12, | 1922 |
| 1,610,467 | Overstreet | Dec. 14, | 1926 |
| 1,910,641 | Goldblatt | Mar. 14, | 1933 |
| 2,480,322 | Cozzoli | Aug. 30, | 1949 |
| 2,665,431 | Elsner | Jan. 12, | 1954 |
| 2,700,412 | Evans | Jan. 25, | 1955 |

FOREIGN PATENTS

| | | | |
|---|---|---|---|
| 118,895 | Great Britain | Sept. 19, | 1918 |
| 302,245 | Italy | Oct. 22, | 1932 |
| 817,095 | Great Britain | July 22, | 1959 |